United States Patent
Maleck et al.

(10) Patent No.: US 11,673,761 B2
(45) Date of Patent: Jun. 13, 2023

(54) METHOD FOR DETERMINING OPERATING CONDITIONS OF A TEXTILE MACHINE, AND A TEXTILE MACHINE

(71) Applicant: Maschinenfabrik Rieter AG, Winterthur (CH)

(72) Inventors: Mario Maleck, Walting (DE); Robin Wein, Manching (DE)

(73) Assignee: Maschinenfabrik Rieter AG, Winterthur (CH)

( * ) Notice: Subject to any disclaimer, the term of this patent is extended or adjusted under 35 U.S.C. 154(b) by 999 days.

(21) Appl. No.: 16/425,271

(22) Filed: May 29, 2019

(65) Prior Publication Data

US 2019/0367319 A1  Dec. 5, 2019

(30) Foreign Application Priority Data

May 29, 2018  (DE) ..................... 10 2018 112 797.9

(51) Int. Cl.
  *B65H 63/00*  (2006.01)
  *D01G 31/00*  (2006.01)
(52) U.S. Cl.
  CPC ........... *B65H 63/00* (2013.01); *D01G 31/006* (2013.01); *B65H 2701/31* (2013.01); *G05B 2219/45191* (2013.01)
(58) Field of Classification Search
  None
  See application file for complete search history.

(56) References Cited

U.S. PATENT DOCUMENTS

| | | | | |
|---|---|---|---|---|
| 3,316,699 A | * | 5/1967 | Mattingly ................ | D02G 1/06 57/100 |
| 3,974,665 A | * | 8/1976 | Rencin ..................... | D01H 4/42 340/677 |
| 4,242,860 A | * | 1/1981 | Wehde ..................... | D01H 4/14 57/264 |
| 4,646,391 A | * | 3/1987 | Wolf ........................ | D01H 1/22 73/862 |
| 5,170,953 A | * | 12/1992 | Stahlecker ........... | B65H 67/085 57/263 |
| 5,323,324 A | | 6/1994 | Fredriksson | |

(Continued)

FOREIGN PATENT DOCUMENTS

| | | |
|---|---|---|
| CN | 1571868 A | 1/2005 |
| CN | 201031275 Y * | 3/2008 |

(Continued)

OTHER PUBLICATIONS

German Patent Office Search Report, dated Mar. 21, 2019.

(Continued)

*Primary Examiner* — Khoa D Huynh
*Assistant Examiner* — Grace Huang
(74) *Attorney, Agent, or Firm* — Dority & Manning, P.A.

(57) ABSTRACT

A method is provided for determining a functional status at a workstation of a textile machine that includes a plurality of the workstations, wherein each workstation includes at least one drive associated with a treatment device configured at the workstation to treat a fiber material. The method includes measuring a load variable of the drive and determining the functional status of the treatment device based on the measured load variable.

11 Claims, 4 Drawing Sheets

(56) References Cited

U.S. PATENT DOCUMENTS

| | | | | |
|---|---|---|---|---|
| 5,555,712 | A * | 9/1996 | Nakade | D01H 13/32 57/264 |
| 5,636,411 | A * | 6/1997 | Greis | D01H 9/008 57/353 |
| 6,389,788 | B1 * | 5/2002 | Koltze | D01H 1/08 57/76 |
| 6,592,066 | B1 | 7/2003 | Hermanns et al. | |
| 6,937,918 | B2 * | 8/2005 | Bahlmann | D01H 13/26 700/130 |
| 10,197,548 | B2 * | 2/2019 | Kousalik | G01N 33/365 |
| 2013/0221894 | A1 * | 8/2013 | Larsson | H02P 6/182 318/696 |

FOREIGN PATENT DOCUMENTS

| | | | | |
|---|---|---|---|---|
| CN | 103 451 831 A | | 12/2013 | |
| CN | 203 360 675 U | | 12/2013 | |
| CN | 107 848 726 A | | 3/2018 | |
| DE | 29 50 063 A1 | | 6/1981 | |
| DE | 2950063 A1 * | | 6/1981 | B65H 63/00 |
| DE | 36 35 863 A1 | | 5/1988 | |
| DE | 3717749 A1 * | | 12/1988 | B65H 63/00 |
| DE | 42 28 300 A1 | | 3/1994 | |
| DE | 44 04 243 A1 | | 8/1995 | |
| DE | 102005030273 A1 * | | 12/2006 | D01H 13/32 |
| DE | 102008037157 A1 * | | 2/2010 | D01H 13/20 |
| DE | 10 2010 009164 A1 | | 8/2011 | |
| DE | 102010009164 A1 * | | 8/2011 | D01H 1/244 |
| DE | 102012023558 A1 * | | 6/2014 | B65H 54/42 |
| DE | 102015008166 A1 * | | 12/2016 | B65H 59/10 |
| EP | 2 053 736 A2 | | 4/2009 | |
| EP | 2053736 A2 * | | 4/2009 | B65H 59/388 |
| EP | 2 309 043 A1 | | 4/2011 | |
| EP | 3153609 B1 * | | 11/2021 | B65H 54/74 |
| JP | S 62250232 A | | 10/1987 | |
| JP | H 0548599 U | | 6/1993 | |
| JP | 6-158459 A | | 6/1994 | |
| WO | WO 03/033786 A1 | | 4/2003 | |
| WO | WO-2005071148 A1 * | | 8/2005 | D01H 13/14 |
| WO | WO-2016074767 A1 * | | 5/2016 | B65H 54/74 |
| WO | WO 2017/080718 A1 | | 5/2017 | |

OTHER PUBLICATIONS

EP Search Report, dated Oct. 23, 2019.
CN Office Action, dated Mar. 11, 2022.
Japanese Examination Report, dated Nov. 29, 2022.

* cited by examiner

METHOD FOR DETERMINING OPERATING CONDITIONS OF A TEXTILE MACHINE, AND A TEXTILE MACHINE

FIELD OF THE INVENTION

The present invention relates to a method for determining a functional status at a workstation of a textile machine, in particular an open-end or air-jet spinning machine, wherein the textile machine comprises a plurality of workstations. Each workstation comprises at least one drive, with the aid of which a treatment means of the particular workstation, which is associated with the drive, is operated for the purpose of treating a fiber material. Moreover, the invention relates to a textile machine for carrying out a method for determining the functional status at a workstation.

BACKGROUND

EP 2 309 043 A1 describes a spinning machine comprising at least one sensor that senses an operating condition of the spinning machine and outputs a signal characterizing this operating condition. Moreover, at least one actuator is provided, to which this signal is fed and which initiates an action on the basis of this signal. The measurement of the operating condition with the aid of the sensor is disadvantageous, however, since the sensor is an additional, cost-generating component.

SUMMARY

A problem addressed by the present invention is therefore that of resolving the disadvantage of the related art. Additional objects and advantages of the invention will be set forth in part in the following description, or may be obvious from the description, or may be learned through practice of the invention.

The problems are solved by a method for determining a functional status at a workstation of a textile machine as well as a textile machine having the features described and claimed herein.

The invention relates to a method for determining a functional status at a workstation of a textile machine. The textile machine can be, for example, an open-end spinning machine or an air-jet spinning machine. The functional status at the workstation can be, for example, a case of wear, a malfunction, a blockage, a failure probability, a productivity, and/or a service life. For example, the blockage can occur between movable components of the workstation. Likewise, the functional status can be an operating condition of a treatment means.

The textile machine also encompasses a plurality of workstations, so that the productivity of the textile machine is multiplied in accordance with the number of workstations.

Moreover, a workstation comprises at least one drive in each case, with the aid of which at least one treatment means of the particular workstation, which is associated with the drive, is operated for the purpose of treating a fiber material. The treatment means treats the fiber material in such a way that the workstation can produce its end product or intermediate product. The treatment means can be components, auxiliary means, and/or devices which process or further convey the fiber material. For example, the workstation can be a card, which can process omnidirectional, individual fibers into a fibrous web. In this case, the treatment means can be, for example, a roller, which is set into rotation by the drive in order to align the omnidirectional fibers.

The fiber material can also be a sliver, however, which, first of all, in a spinning station, is opened by a treatment means, for example, an opening unit, into individual fibers that are subsequently spun into a yarn by a treatment means in the form of a spinning rotor. The drive can drive the opening unit or the spinning rotor in this case.

The workstation can also be a rewinding unit, however, with the aid of which a yarn is rewound from one package to another package.

According to the invention, at least the functional status of at least one treatment means is determined on the basis of a measurement of a load variable of the at least one drive. Additionally or alternatively, a functional status of a drive can also be determined. Additionally or alternatively, a functional status of the workstation can be inferred from the functional status of the treatment means and/or of the drive. In the case of a functional status, which indicates, for example, that a spinning rotor is not 100% operational, the functional status of the workstation is likewise limited. If the functional status is an operating condition of a treatment means, it can be detected, with the aid of the measurement of the load variable, whether the treatment means, in particular the opening unit, or the workstation is in regular operation or in piecing operation.

In particular, the functional status of the drive at which the load variable is measured can be determined. The load variable can be, for example, a load angle of the at least one drive. In the case of an electric drive, the load angle is defined as an angle between a stator field and a rotor field of the drive.

Additionally or alternatively, the load variable can also be a torque of the drive. A behavior of the drive can be determined with the aid of the measurement of the load variable, so that the behavior can be more precisely determined. In particular, the load variable, in particular the load angle and/or the torque, can be determined with the aid of a current, a voltage, and/or with the aid of the time profiles of the current and/or the voltage of the drive. The measurement of the load variable can therefore be carried out, in particular, without the aid of a sensor. As a result, the measurement of the load variable can take place reliably and precisely.

The method is explained in the following, by way of example, with reference to the load angle. The method can be readily transferred to other load variables, however.

The load angle is the angle between the stator field and the rotor field of the electric drive. In the case of an unloaded drive, the load angle is 0°. In the case of an increasing load, however, the load angle increases. When the load angle is 0°, the stator field and the rotor field are oriented antiparallel with respect to one another. If the drive is loaded, however, the load angle increases, and so the functional status can be inferred on the basis thereof. With the aid of the load angle, inferences may therefore be drawn regarding the load acting on the drive. In addition, changes of the load on the drive may be inferred with the aid of a change of the load angle. If, for example, the drive of the workstation jams, the load angle increases. The jam can be inferred from this information, and so the functional status is determined.

In an advantageous enhanced embodiment of the invention, the load variable is measured at at least one drive, which is associated with a treatment means in the form of an opening unit, a spinning rotor, a traversing device, a pair of delivery rollers, a package, and/or a winding roller. As a result, the functional status of the driven treatment means of the workstation can be determined.

It is advantageous when a blockage, a case of wear, a failure probability, a service life, and/or a maintenance interval of a treatment means and/or a drive are/is determined on the basis of the measurement of the load variable. For example, a replacement of the treatment means can be planned upon the detection of wear. The number of treatment means to be kept available for a future replacement can be planned on the basis of the failure probability or the service life. A maintenance plan for the workstation and/or the textile machine can be planned on the basis of the maintenance intervals. When the wear occurs or intensifies, for example, a treatment means may move more sluggishly, and so the drive associated with the treatment means becomes more heavily loaded and the load variable, for example, the load angle, increases. The wear can be inferred on the basis of this measurement.

Additionally or alternatively, a productivity of the workstation can be determined on the basis of the measurement of the load variable. As a result, production costs for an end product can be calculated. As a result, for example, workstations having low productivity can be treated in a particular way, in that, for example, they are switched off or are subjected to more intensive maintenance. If the workstation has high productivity, at least one drive is more heavily loaded, and so the load variable changes. In particular, when the workstation has high productivity, all drives of the workstation are similarly more heavily loaded, and so the increased productivity can be inferred on the basis thereof.

Additionally or alternatively, the presence of the fiber material in the workstation can be determined on the basis of the measurement of the load variable. When a drive of the treatment means or multiple, in particular all, drives of the treatment means of the workstation is/are unloaded, the load variable or the load variables of the drives, for example, in the form of the load angle, is/are essentially zero or, when the drives are idle, the load variable or the load variables of the drives is/are at least substantially lower than in the case of loaded drives, wherein this can be an indication of the non-presence or the absence of the fiber material. For example, it may happen on yarn-producing workstations that a sliver stored in a can for producing a yarn has run out, and so, consequently, the production of yarn is interrupted, but the drives of the workstation continue to operate the treatment means. If the fiber material has been depleted, this can be detected on the basis of the smaller load angle or the abrupt change of the load angle, and the workstation can be switched off and/or an appropriate message can be output in order to save energy or alert an operator to the need to refill the fiber material. In addition, excessive wear of the unloaded treatment means, in particular the feed roller, can also be avoided. Likewise, during piecing, it can be detected whether a fiber material is present and, if fiber material is missing, the drive of the opening unit and of the feed unit of the spinning station can be stopping. As a result, an unnecessary piecing process can be avoided.

Moreover, it is advantageous when the blockage of a treatment means is determined before an end position, a stopping position, and/or a stop position of the treatment means is reached. Since the blockage of the treatment means is a condition similar to the attainment of the end position, the stopping position, and/or the stop position, it can be advantageous to detect the blockage before the corresponding position has been reached, in order to not confuse it with the attainment of the end position, the stopping position, and/or the stop position. For example, the treatment means can be a traversing device, which traverses back and forth between two end positions. In the end positions, the traversing direction of the traversing device reverses, and so, in the end positions, a specific profile or change of the load variable occurs, which is at least similar in both end positions. The blockage between the end positions can be inferred from the comparison of the behavior of the load variable during blockage and the behavior of the load variable in the end positions.

It is likewise advantageous when an exceedance of a limiting value by the load variable is detected. As a result, the drive can be protected against malfunctions or damage, for example, due to overload. In particular, a limiting value of 90° can be selected for the load angle, since, from this load angle forward, the drive tilts and can stop. Additionally or alternatively, a falling below of a limiting value by the load variable can also be detected. On the basis thereof, it can therefore be inferred that a load of the drive has decreased or is gone.

Moreover, it is advantageous when a load variable profile is created on the basis of the measurement of the load variable. In order to create the load variable profile, the load variable can be plotted, for example, in a time interval with respect to time. With the aid of a load variable profile, which describes the progression of the load variable in a comparatively short interval, for example, a few seconds, changes in the functional status of a treatment means that occur relatively abruptly, for example, can be detected. Therefore, for example, blockages, which occur essentially within a few seconds can be detected. During the blockage, the load variable changes relatively quickly, and so the creation of the load variable profile in the short time interval suffices. If the load variable profile is therefore generated only within a few seconds, errors of this type, such as blockages or the absence of the fiber material, can be detected.

Additionally or alternatively, the load variable profile can also be generated over a longer period of time or in a longer time interval. The length of the period of time depends on the type of the functional status to be determined. For example, when a case of wear of a treatment means is to be detected, the load variable profile can be created over a period of time during which the wear has significant effects on the load variable. Such a time interval can certainly amount to a few days or weeks. Due to the wear, the load variable can change over this long period of time, which can be detected on the basis of the load variable profile which was recorded over a period of several days to weeks.

The load variable profile can be continuously created, so that the functional status of the treatment means and/or of the drive is continuously monitored. In addition, the load variable profile can also be created in certain time intervals, and so an outlay for measurement and/or computation for the comparison is relatively low.

It is advantageous when at least one reference value, preferably a reference profile, of the load variable of the drive is generated on the basis of the measurement of the load variable. Therefore, for example, a reference profile of the spinning rotor drive can be created. The reference profile can be recorded over a certain period of time. The reference profile is preferably created when a normal functional status is present, i.e., when there is no malfunction or the like. The reference profile indicates the progression of the load angle over time. A comparison with a normal operation of the workstation is possible with the aid of the reference value or the reference profile. Likewise, a reference value can be generated for the load variable of the drive of the opening unit in order, for example, to detect the presence of the fiber material. The reference value can likewise be generated when a normal functional status is present, i.e., a fiber material is present at the workstation.

It is advantageous when the reference value or the reference profile is generated during a first start phase of the workstation. Additionally or alternatively, the reference value or the reference profile can also be generated during a first start phase of the drive and/or of the treatment means. The first start phase is after a completion of the workstation, while all components of the workstation still function properly, i.e., the treatment means generally have no wear or the like and, for example, are not blocked. The workstation therefore still has no wear, no malfunctions, the longest service life, and the lowest failure probability. A reference profile created during this time therefore represents the preferred functional status of the workstation.

It can be reasonable to generate a reference value during the first start phase of a treatment means, for example, in order to detect the presence of the fiber material or possibly also a thread in the treatment means. For example, a reference value for the drive of the opening unit can be generated immediately after the start of the piecing process, when the fiber feed has not yet begun and the opening unit is therefore still idle, without combing fiber material. If necessary, the reference value can even be generated already during the pre-feed.

The reference value or the reference profile can be advantageously compared with the presently measured load variable or the recorded load variable profile. The presently measured load variable or the load variable profile reflects the present functional status of the drive and/or of the treatment means. Differences between the instantaneous functional status and the functional status during a point in time at which the drive, the treatment means, and/or the workstation functioned properly can be determined with the aid of the comparison of the load variable profile with the reference profile. In the aforementioned example of the opening unit, for example, if the presently measured value of the load variable is above the previously determined reference value after the start-up of the fiber feed or during the spinning operation, it is assumed that the sliver is present and the piecing or the regular spinning process is continued. If it is detected, however, that the value of the load variable is equal to the previously determined reference value, it is inferred therefrom that the sliver is missing and the piecing is aborted or, in the case of a running workstation, the relevant workstation is stopped.

It is also advantageous when a progression of the load variable profile of the drive is compared with an instantaneous position of the treatment means of the workstation, which is driven by the drive. Additionally or alternatively, the progression of the load variable profile of the drive can also be compared with an instantaneous rotation position of the treatment means of the workstation, which is driven by the drive. The driven treatment means of the workstation can be, for example, the traversing device, so that an offset between a setpoint position and an actual position of the traversing device can be detected with the aid of the comparison of the progression of the load variable profile with the instantaneous position. The progression of the load variable profile has a specific shape when, for example, the traversing device is driven by the drive, in particular at reversal points of the traversing device. A difference between the setpoint position and the actual position can be inferred on the basis of a comparison of an instantaneous position of the traversing device.

Moreover, it is advantageous when the load variable of a drive of a first workstation is compared with the load variable of the corresponding drive of a second workstation. Additionally or alternatively, the load variable profile of the drive of the first workstation can also be compared with the load variable profile of the corresponding drive of the second workstation. Therefore, for example, the load variables and/or the load variable profile of the drives of the spinning rotors of the two workstations can be compared with one another. As a result, the functional status of the two workstations can be compared. For example, which of the two spinning rotors of the two workstations has a higher productivity can therefore be determined. If the spinning rotor of the first workstation has a higher productivity, for example, than the spinning rotor of the second workstation, the drive of the one spinning rotor is more heavily loaded than the drive of the other spinning rotor. As a result, the load variables of the two drives assigned to the spinning rotors are different, and so the productivity of the workstations or the difference between the productivities of the two workstations can be inferred therefrom. Moreover, for example, the wear of the two spinning rotors can be detected, since the two load variables and/or the load variable profiles deviate from one another in this case. In particular, the deviation of the two load variables and/or of the load variable profiles of the two drives can be compared with one another. Additionally or alternatively, the drives of more than two workstations can also be compared. Only the drives that are assigned to a certain treatment means can be compared with one another in this case. For example, the load variables and/or the load variable profiles of one part of the drives of the spinning rotors of the textile machine or even the load variables and/or the load variable profiles of all drives of the spinning rotors of a textile machine can be compared with one another. As a result, it can be determined, for example, which spinning rotor has the highest productivity or, for example, the least amount of wear. If, for example, all drives of the first workstation are more heavily loaded than all drives of the second workstation, this can be an indication that the first workstation has a higher productivity than the second workstation.

It is also advantageous when the load variable of at least a first drive of a workstation is compared with a load variable of a second drive of the same workstation. Additionally or alternatively, the load variable profile of at least the first drive of the workstation can also be compared with the load variable profile of the second drive of the same workstation. The two drives or the treatment means operated with the aid of the drives can be arranged one behind the other, in particular directly, for example, in a delivery direction of a yarn. As a result, for example, a malfunction that occurs between these two drives can be detected. Additionally or alternatively, the load variables and/or load variable profiles of multiple drives of a workstation can also be compared with one another.

When the load variable of a drive is statistically evaluated, this likewise has advantages. Additionally or alternatively, the load variable profile can also be statistically evaluated. For example, a case of wear can be inferred from a continuous, in particular constant, change of the load variable and/or of the load variable profile, and so the change of the load variable can be measured. A slope (positive or negative) over time, for example, can therefore be determined. A standard deviation, a variance, and/or a statistical distribution, in particular a Gaussian distribution of the load variable, for example, can be evaluated.

It is advantageous when a mean value of the load variable is determined. Additionally or alternatively, a fluctuation of the load variable can also be determined. Likewise additionally or alternatively, the mean value and/or the fluctuation of the load variable profile can also be determined. A time average, for example, can be formed as the mean value. It is also advantageous when the periodicity of the fluctuation is determined. The periodic fluctuation of the load variable can occur, for example, in a drive, which drives a treatment means with an imbalance.

Moreover, it is advantageous when the load variable can be measured with the aid of a controller of the workstation and/or of the textile machine. Additionally or alternatively, the functional status of the drive and/or of the treatment means can also be determined with the aid of the controller. The controller can be preferably connected to the at least one drive, so that the controller can control the drive and receive the load variable from the drive or measure the load variable itself. An evaluation program, for example, can be stored in the controller, which generates the load variable, changes of the load variable, the reference profile, and/or the load variable profile. This data can also be stored in the controller in a memory or can already be present in the memory. The controller can measure the load variable, for example, by measuring a current and/or a voltage of the drive. In particular, the controller can determine the load variable by measuring an induced voltage occurring in the operation of the drive. The controller can also, for example, measure a phase shift between the current, the voltage of the drive, and the induced voltage and, on the basis thereof, determine the load variable.

Moreover, the invention relates to a textile machine, in particular an open-end or air-jet spinning machine, comprising a plurality of workstations, each of which comprises at least one drive. With the aid of the drive, at least one treatment means of the particular workstation, which is assigned to the drive, can be operated for the purpose of treating a fiber material. If the workstation is, for example, a spinning station, the treatment means can be, for example, an opening unit, a spinning rotor, a pair of delivery rollers, a traversing device, and/or a winding roller.

In addition, the textile machine comprises at least one controller, with the aid of which at least one drive of the textile machine can be controlled. Additionally or alternatively, a workstation and/or a group of workstations can comprise the controller. The controller comprises means, with the aid of which the controller can activate the drives. The controller can also comprise a memory unit, in order to store a control program, a processing unit, in order to evaluate measured values, and/or at least one interface, via which the control data and/or measuring data can be exchanged.

According to the invention, the controller is designed in such a way that the textile machine is operated according to a method according to at least one feature of the preceding description and/or the following description.

BRIEF DESCRIPTION OF THE DRAWINGS

Further advantages of the invention are described in the following exemplary embodiments. Wherein.

DETAILED DESCRIPTION

Figure 1:
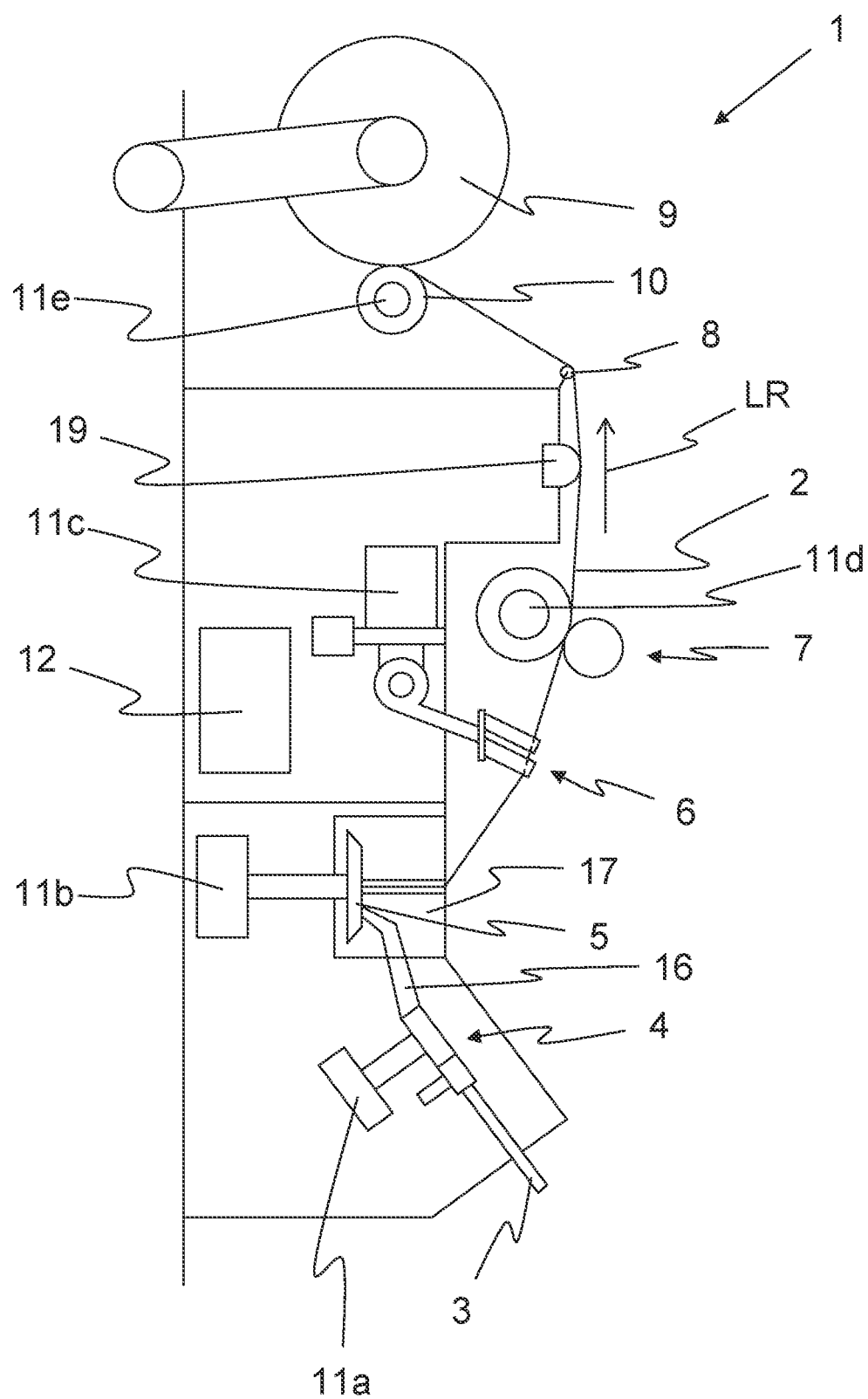
FIG. 1 shows a schematic side view of a workstation of an open-end spinning machine.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic side view of a workstation 1 of a textile machine 18. The textile machine 18 can comprise a plurality of workstations 1. In the present exemplary embodiment, the workstation 1 is designed as a spinning position. The spinning position can receive a sliver 3 and produce a yarn 2. The workstation 1 shown in FIG. 1 produces the yarn 2 from a sliver 3. The yarn 2 passes through the workstation 1 in a delivery direction LR and can be wound onto a package 9.

The workstation 1 of the present exemplary embodiment comprises an opening unit 4, which opens individual fibers 16 from the sliver 3. The individual fibers 16 are guided to a spinning rotor 5, which produces the yarn 2 from the individual fibers 16. In the present exemplary embodiment, the spinning rotor 5 is arranged in a spin box 17. The yarn 2 formed by the spinning rotor 5 is drawn from the spinning rotor 5 out of the spin box 17 with the aid of a pair of delivery rollers 7, wherein the yarn 2 can also pass through a first traversing device 6, which traverses the yarn 2. With the aid of the first traversing device 6, the yarn 2 can be traversed between the pair of delivery rollers 7 in order to reduce or delay a wear of the pair of delivery rollers 7. The workstation 1 comprises a diverting unit 8, which is positioned downstream from the pair of delivery rollers 7 in the delivery direction LR and diverts the yarn 2 to the package 9, on which the yarn 2 is wound. Downstream from the diverting unit 8, in the delivery direction LR, the workstation 1 of the present exemplary embodiment comprises a second traversing device 20, with the aid of which the yarn 2 can be traversed between the diverting unit 8 and the package 9. The yarn 2 can be wound on a width of the package 9 with the aid of the second traversing device 20. The package 9 can be driven by a winding roller 10, which rests against the package 9 and drives the package 9 with the aid of friction between the package 9 and the winding roller 10. Additionally or alternatively, the package 9 itself can also comprise a drive.

In the present exemplary embodiment, a thread monitor 19 is arranged between the pair of delivery rollers 7 and the diverting unit 8, with the aid of which a presence of the yarn 2 can be monitored.

According to the present exemplary embodiment, the opening unit 4, the spinning rotor 5, the first traversing device 6, the pair of delivery rollers 7, the diverting unit 8, the second traversing device 20, the package 9, the winding roller 10, and the thread monitor 19 are treatment means, with the aid of which the fiber material is processed in the workstation 1. The opening unit 4, for example, changes a shape of the fiber material. The opening unit 4 opens individual fibers 16 from a sliver 3. The spinning rotor 5 can process the individual fibers 16 into a yarn 2. The first traversing device 6 and/or the second traversing device 20 move/moves the yarn 2 laterally with respect to the delivery direction LR. The pair of delivery rollers 7 transports the yarn 2 in the delivery direction LR, however.

Moreover, the workstation 1 comprises at least one drive. In the present exemplary embodiment, the workstation 1 comprises multiple drives 11a-11e, wherein a drive 11a-11e (the drive assigned to the second traversing device 20 is not shown in the figures) is assigned to each of the treatment means, which, according to the present exemplary embodiment, are the opening unit 4, the spinning rotor 5, the first traversing device 6, the pair of delivery rollers 7, the second traversing device 20, and the winding roller 10. The treatment means 4, 5, 6, 7, 10, 20 can therefore be driven individually and independently of one another with the aid of the assigned drives 11a-11e.

In addition, the workstation 1 can advantageously comprise a controller 12, which can be connected to the at least one drive 11a-11e with the aid of a connection (not shown here), in order to control the drive 11a-11e and, as a result, to be able to carry out the production process of the yarn 2.

In order to be able to determine a functional status of the workstation 1, according to the invention, a load variable of the at least one drive 11a-11e of the workstation 1 is measured. The load variable can be, for example, a load angle $\alpha$ of a drive 11a-11e. The load variable can also be a torque, however, which the drives 11a-11e apply. The functional status can be, for example, a malfunction, a blockage, a productivity, a service life, a case of wear, and/or a failure probability of the drive 11a-11e and/or of a treatment means 4, 5, 6, 7, 10, 20. The functional status of the workstation 1 can be inferred on the basis of the functional status of a drive 11a-11e and/or a treatment means 4, 5, 6, 7, 10, 20. Generally, a limitation, for example, of a functional status of a drive 11a-11e and/or of a treatment means 4, 5, 6, 7, 10, 20 results in a limitation of the functional status of the entire workstation 1. For example, a slow operation of the opening unit 4 can be a limiting factor of the functional status of the workstation 1.

The load angle $\alpha$ is explained in the following FIGS. 2a-2c as an example for a load variable. The load angle $\alpha$ is defined as an angle between a stator field N-S and a rotor field N'-S' of an electric motor. The drives 11a-11e can therefore be electric drives, in particular electric motors.

Figure 2A:
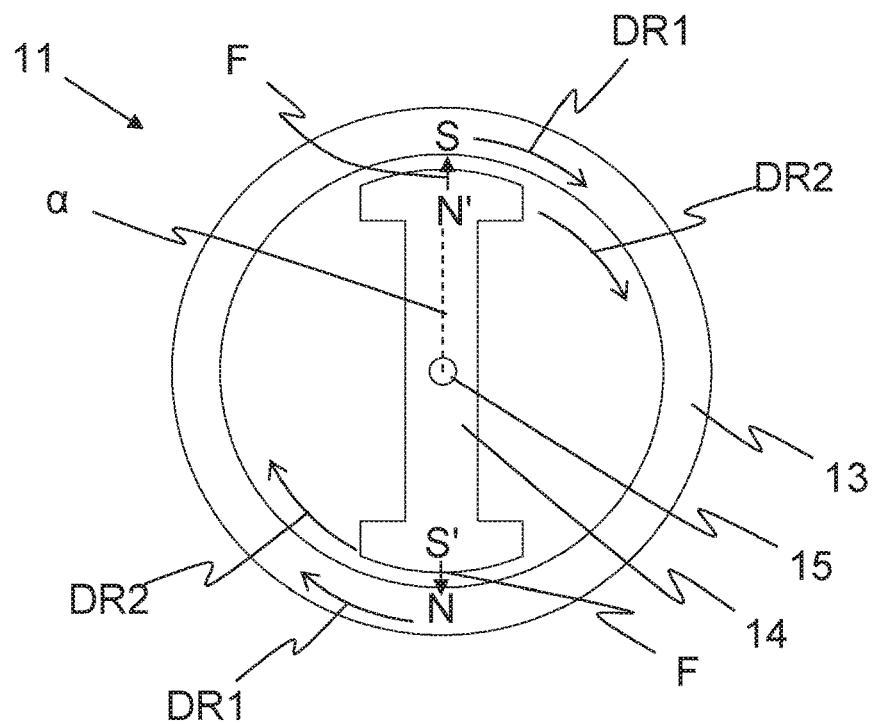
FIGS. 2a-c show a schematic cross section of a drive comprising a stator and a rotor.
Figure 2B:
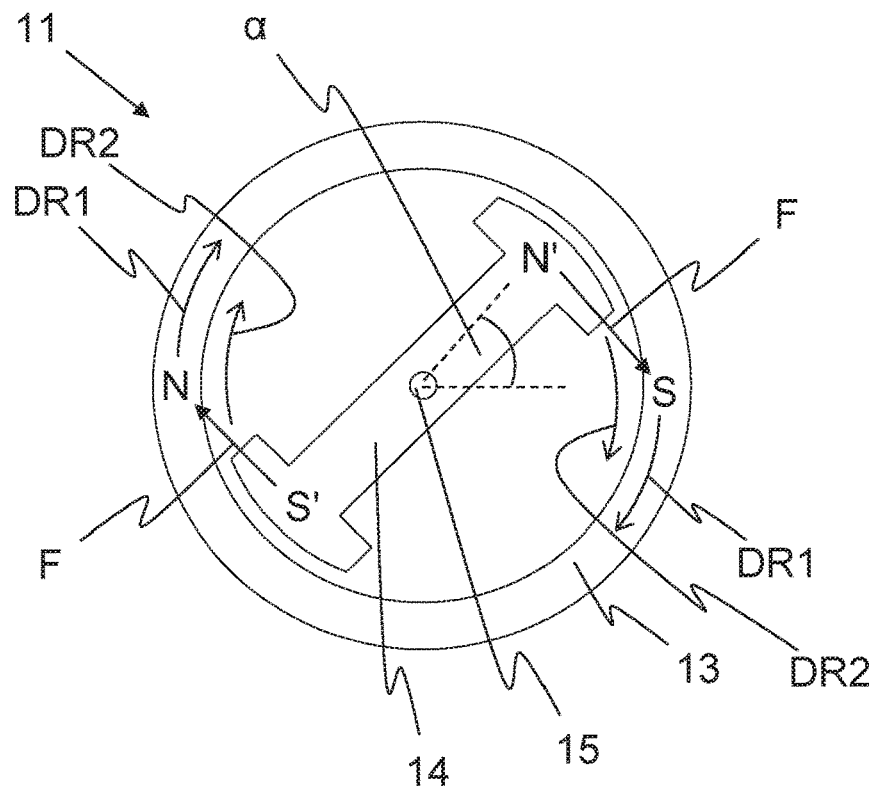
Figure 2C:
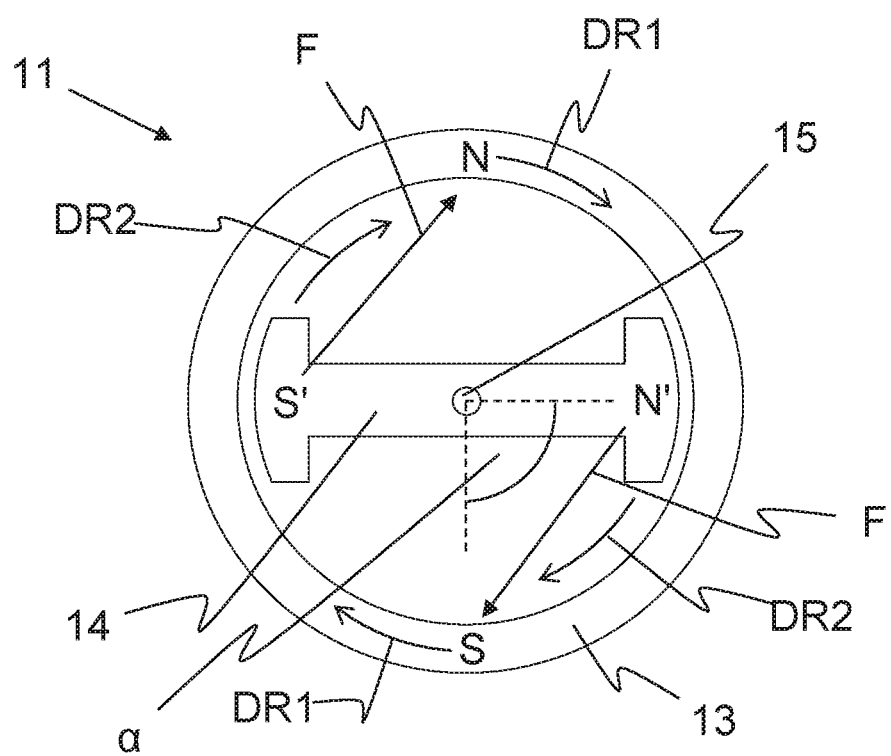

FIGS. 2a-c show schematic cross sections of an electric drive 11 comprising a stator 13 and a rotor 14. According to the FIGS. 2a-2c, the rotor 14 is rotatable about a rotational axis 15. The stator 13 forms, at least during the operation of the drive 11, the stator field N-S which is formed by way of example in the stator 13. Moreover, the rotor 14 forms, at least during the operation of the drive 11, the rotor field N'-S' which is formed, in this case, by way of example, between the north pole N' of the rotor field N'-S' and the south pole S' of the rotor field N'-S'. The two fields affect one another, and so the drive 11 can apply a torque.

The north pole N as well as the south pole S of the stator field N-S can rotate in the direction of rotation DR1 during the operation of the drive 11. The north pole N and the south pole S are consistently arranged so as to be offset by 180° with respect to one another, and so they also consistently move identically in the direction of rotation DR1. Consequently, the same reference sign DR1 is assigned to the two arrows associated with the north pole N and the south pole S.

Due to a magnetic force F between the stator field N-S and the rotor field N'-S', the rotor 14 can also be set into rotation with the aid of a generated rotation of the stator field N-S in the direction of rotation DR1. The magnetic force F is formed between the south pole S and the north pole N' and between the north pole N and the south pole S'. The rotor 14 then rotates in the direction of rotation DR2.

If, for example, the south pole S of the stator field N-S arranged in the upper section of the stator 13 in FIG. 2a rotates in the direction of rotation DR1, it carries the north pole N' of the rotor field N'-S' along due to the magnetic force F, and so the rotor 14 rotates as well in the direction of rotation DR2. The same applies for the north pole N of the stator field N-S arranged in the lower section of the stator 13. The north pole N carries the south pole S' of the rotor field N'-S' along due to the magnetic force F, and so the rotor 14 rotates as well, once more, in the direction of rotation DR2. The direction of rotation DR1 and the direction of rotation DR2 are consistently identically oriented during a normal operation of the drive 11.

In the present exemplary embodiment of FIG. 2a, the load angle $\alpha$ between the stator field N-S and the rotor field N'-S' is 0°, since the south pole S and the north pole N' as well as the north pole N and the south pole S' are not angularly offset with respect to one another. This is the case during the operation of the drive 11 when the drive 11 is unloaded. Without a load, the rotor 14 can consistently follow the rotating stator field N-S.

An example in which the drive 11 is loaded is shown in FIG. 2b. A load therefore acts on the drive 11. The north pole N and the south pole S of the stator field N-S have rotated further as compared to FIG. 2a. The stator field N-S therefore leads the rotor field N'-S'. Since a load acts on the rotor 14, the load inhibits the rotation of the rotor 14. The rotor 14 trails the stator field N-S, and so the load angle $\alpha$ is now in the range of approximately 45°.

The load angle $\alpha$ of approximately 45° also has the effect, however, that the magnetic force F and the rotor 14 are at an angle with respect to one another, and so, due to the lever principle, a torque acts on the rotor 14 with the aid of the magnetic force F. The drive 11 can move the load resting against it.

FIG. 2c shows an exemplary embodiment in which the load angle $\alpha$ is approximately 90°. The rotor field N'-S' trails the stator field N-S even further as compared to the drive 11 according to FIG. 2b. At such a load angle $\alpha$, a maximum torque can be transmitted onto the rotor 14. At the load angle $\alpha$ of 90°, however, there is the risk that the drive 11 will tilt when the load angle $\alpha$ becomes greater than 90°. As a result, the drive 11 can stop, and so, as a result, the workstation 1 can be put out of operation.

A functional status of a drive 11 and/or a treatment means 4, 5, 6, 7, 10, 20 can be determined with the aid of the measurement of the load angle $\alpha$. As explained above, the load angle $\alpha$ also depends on the load which is applied on the drive 11. With the aid of the measurement of the load angle $\alpha$, it is therefore possible to infer the load, which acts on the drive 11 and/or on the treatment means 4, 5, 6, 7, 10, 20. The functional status of the drive 11 and/or the treatment means 4, 5, 6, 7, 10, 20 driven with the aid of the drive 11 can be inferred on the basis of the load and/or a time profile.

For example, the opening unit 4 can jam, and so the rotor 14 no longer rotates. The stator field N-S continues to rotate, and so the load angle $\alpha$ constantly changes. The change of the load angle $\alpha$ is equal to the rotational frequency of the stator field N-S in this case. When this is measured, it can be inferred that the opening unit 4 is jammed and this functional status is present.

For example, an amount of the yarn 2 wound on the package 9 can also be measured as the functional status. If the amount of yarn 2 wound on the package 9 increases, a moment of inertia of the package 9 necessarily increases. As a result, the drive 11e of the winding roller 10 is increasingly loaded, and so the load angle $\alpha$ also increases along with the amount of the yarn 2 on the package 9. As a result, the amount of the yarn 2 on the package 9 can be determined as a functional status. As a result, in particular, an increase of the amount of the yarn 2 on the package 9 over time can also be determined. As a result, for example, a productivity of the workstation 1 can be inferred.

It is advantageous when a reference profile of the load variable of at least one drive 11a-11f is created on the basis of the measurement of the load variable. Thereafter, the reference profile can be compared with a load variable profile recorded during the operation of the workstation 1. The load variable profile can be continuously recorded over a time interval. The load variable profile can encompass changes of the load variable and/or the magnitude of the load variables. The load variable profile can also be statistically evaluated.

Figure 3:
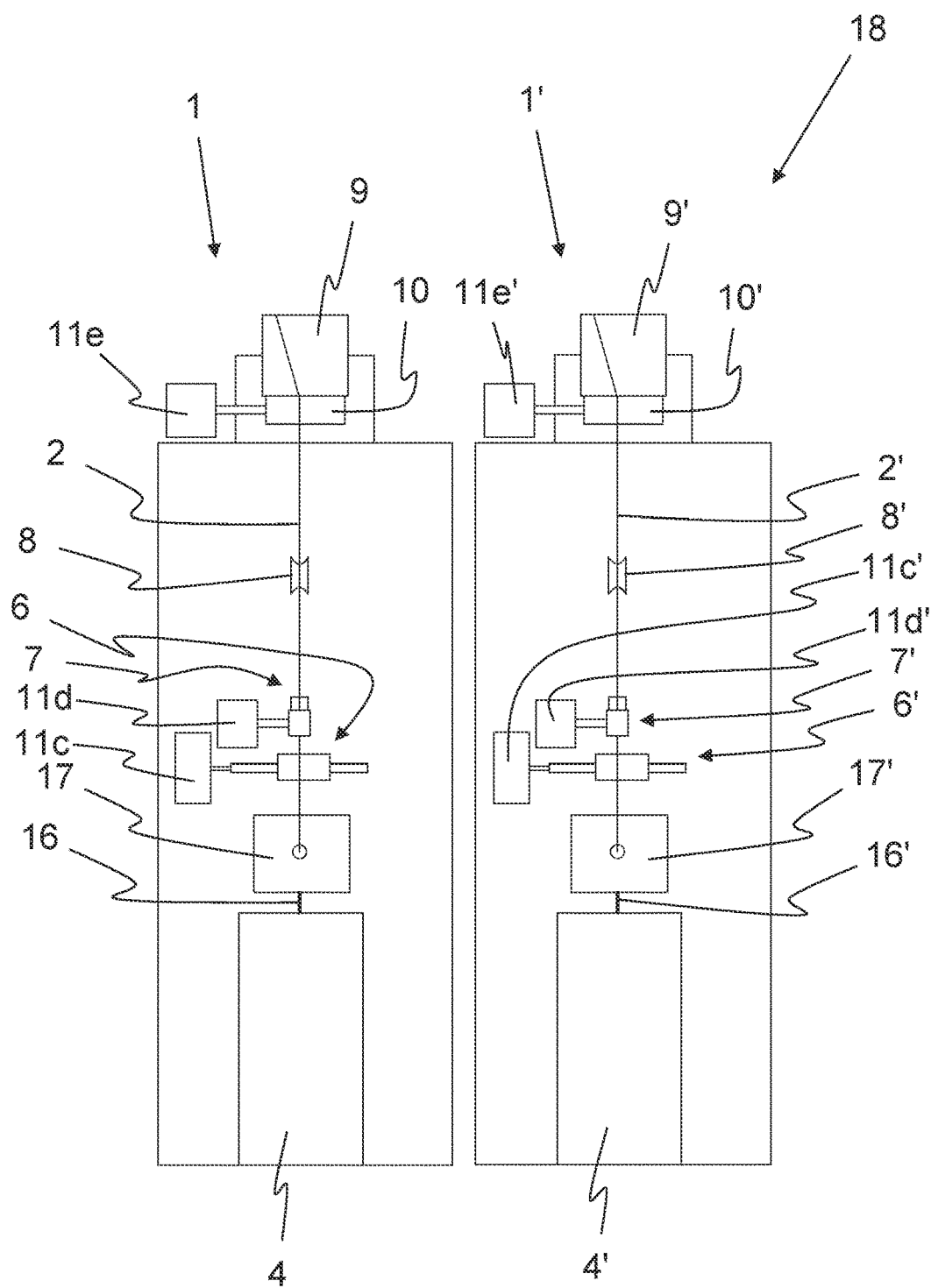
FIG. 3 shows a schematic front view of a textile machine comprising two workstations.

FIG. 3 shows a front view of a textile machine 18 comprising at least two workstations 1, 1'. The two workstations 1, 1' have the same features as one another as well as with respect to FIG. 1, and so the features will not be further explained. The elements of the workstation 1' are provided with reference signs including an apostrophe.

Advantageously, the load variable of a drive 11a-11f of the first workstation 1 can be compared with the load variable of the corresponding drive 11a'-11f' of the second workstation 1'. For example, the load variable of the drive 11e of the winding roller 10 can be compared with the load variable of the drive 11e' of the winding roller 10'. As a result, differences between the winding rollers 10, 10' or between the packages 9, 9' can be inferred.

Moreover, the load variables and/or load variable profiles of the drives of the spinning rotors not shown here can also be measured. As a result, for example, a difference in the productivity or in the wear of the two spinning rotors can be determined.

The present invention is not limited to the represented and described exemplary embodiments. Modifications within the scope of the claims are also possible, as is any combination of the features, even if they are represented and described in different exemplary embodiments.

LIST OF REFERENCE NUMERALS

1 workstation
2 yarn
3 sliver
4 opening unit
5 spinning rotor
6 first traversing device
7 pair of delivery rollers
8 diverting unit
9 package
10 winding roller
11a-11e drive
12 controller
13 stator
14 rotor
15 rotational axis
16 fibers
17 spin box
18 textile machine
19 thread monitor
20 second traversing device
LR delivery direction
$\alpha$ load angle
N north pole
S south pole
N' north pole
S' south pole
N-S stator field
N'-S' rotor field F magnetic force
DR1 direction of rotation of the stator field
DR2 direction of rotation of the rotor field

The invention claimed is:

1. A method for determining a functional status at a workstation of a textile machine that includes a plurality of the workstations, wherein for each respective workstation there is at least one drive associated with a treatment device to treat a fiber material, the method for each respective workstation comprising:
measuring a load variable of the at least one drive
wherein the load variable is a load angle of the at least one drive;
creating a load variable profile based on the measurements of the load variable; and
determining the functional status of a first one of the workstations compared to the functional status of a second one of the workstations by comparing the measurements of the load variable or the load variable profile of the first workstation to corresponding measurements of the load variable or the load variable profile of the second workstation.

2. The method as in claim 1, wherein the at least one drive is associated with one or more of an opening unit, a spinning rotor, a traversing device, a pair of delivery rollers, a package, or a winding roller of the respective workstation.

3. The method as in claim 1, wherein for each respective workstation, further comprising detecting one or more of the following from the measurements of the load variable or the load profile: a blockage of the treatment device or the at least one drive; a case of wear of the treatment device or the at least one drive; a failure probability of the treatment device or the at least one drive; a service life of the treatment device or the at least one drive; a maintenance interval of the treatment device or the at least one drive; productivity of the workstation; presence of a fiber material in the workstation; or a possibility of resolving causes of error at the workstation.

4. The method as in claim 1, wherein for each respective workstation, further comprising detecting blockage of the treatment device from the measurements of the load variable before the treatment device reaches an end position or a stop position along a working path thereof.

5. The method as in claim 1, wherein for each respective workstation, further comprising monitoring whether the measurements of the load variable or the load profile exceeds or falls below a limiting value.

6. The method as in claim 1, wherein for each respective workstation, further comprising creating a reference profile based on initial measurements of the load variable during a first start phase of the workstation and comparing the load variable to the reference profile.

7. The method as in claim 1, wherein for each respective workstation, further comprising comparing an instantaneous position of the treatment device with a progression of the load variable profile.

8. The method as in claim 1, wherein for each respective workstation, further comprising comparing a first measured load variable or a first load variable profile of a first one of the at least one drive to a second measured load variable or a second load variable profile of a second one of the at least one drive of the workstation.

9. The method as in claim 1, wherein for each respective workstation, further comprising statistically evaluating the measurements of the load variable or the load variable profile.

10. The method as in claim 1, wherein for each respective workstation, further comprising generating a mean value of the measurements of the load variable or the load variable profile.

11. The method as in claim 1, wherein for each respective workstation, a controller at the workstation measures the load variable and determines the functional status.

* * * * *